(12) United States Patent
Liu

(10) Patent No.: US 11,160,005 B2
(45) Date of Patent: Oct. 26, 2021

(54) METHOD AND DEVICE FOR DETERMINING SERVICE PATH

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/620,344

(22) PCT Filed: Aug. 10, 2017

(86) PCT No.: PCT/CN2017/096949
§ 371 (c)(1),
(2) Date: Dec. 6, 2019

(87) PCT Pub. No.: WO2019/028795
PCT Pub. Date: Feb. 14, 2019

(65) Prior Publication Data
US 2020/0205054 A1   Jun. 25, 2020

(51) Int. Cl.
   *H04W 4/00*   (2018.01)
   *H04W 40/28*  (2009.01)
   (Continued)

(52) U.S. Cl.
   CPC ....... *H04W 40/28* (2013.01); *H04W 28/0268* (2013.01); *H04W 28/08* (2013.01);
   (Continued)

(58) Field of Classification Search
   CPC ......... H04W 28/0226; H04W 28/0231; H04W 28/0236; H04W 28/0242; H04W 28/0268;
   (Continued)

(56) References Cited

U.S. PATENT DOCUMENTS

| | | | |
|---|---|---|---|
| 2014/0133294 A1 | 5/2014 | Horn et al. | |
| 2015/0078360 A1 | 3/2015 | Wang et al. | |

(Continued)

FOREIGN PATENT DOCUMENTS

| | | |
|---|---|---|
| CN | 102223677 | 10/2011 |
| CN | 103118399 | 5/2013 |

(Continued)

OTHER PUBLICATIONS

WIPO, ISR for PCT/CN2017/096949, dated Dec. 28, 2017.
(Continued)

*Primary Examiner* — Huy C Ho
(74) *Attorney, Agent, or Firm* — Hodgson Russ LLP

(57) ABSTRACT

Disclosed in embodiments of the present application are a method and device for determining a service path. The method includes: if a terminal device accesses a network by a first service path, obtaining a network load state of the first service path; and according to the network load state, switching a service path by which the terminal device accesses the network from the first service path to a second service path.

10 Claims, 3 Drawing Sheets

(51) Int. Cl.
*H04W 28/02* (2009.01)
*H04W 28/08* (2009.01)
*H04W 36/14* (2009.01)
*H04W 36/30* (2009.01)
*H04W 48/18* (2009.01)
*H04W 88/06* (2009.01)

(52) U.S. Cl.
CPC ........... *H04W 36/14* (2013.01); *H04W 36/30* (2013.01); *H04W 48/18* (2013.01); *H04W 88/06* (2013.01)

(58) Field of Classification Search
CPC ..... H04W 52/40; H04W 36/14; H04W 36/16; H04W 36/165; H04W 36/18; H04W 36/20; H04W 36/22; H04W 36/24; H04W 36/30; H04W 52/343; H04W 16/02; H04W 16/04; H04W 16/06; H04W 16/08; H04W 28/08; H04W 48/18; H04W 48/20; H04W 48/00; H04W 48/02; H04W 48/04; H04W 48/06
USPC .......................................................... 370/331
See application file for complete search history.

(56) References Cited

U.S. PATENT DOCUMENTS

| | | | |
|---|---|---|---|
| 2015/0215812 A1* | 7/2015 | Ye | H04W 36/22 455/437 |
| 2015/0257070 A1 | 9/2015 | Zhao et al. | |
| 2015/0382269 A1* | 12/2015 | Liang | H04B 7/0632 370/332 |
| 2016/0014680 A1 | 1/2016 | Jang et al. | |
| 2016/0112921 A1 | 4/2016 | Nagasaka et al. | |
| 2016/0174104 A1* | 6/2016 | Jang | H04W 28/08 455/453 |
| 2016/0269988 A1 | 9/2016 | Li et al. | |
| 2017/0026824 A1 | 1/2017 | Kim et al. | |

FOREIGN PATENT DOCUMENTS

| | | |
|---|---|---|
| CN | 104602300 | 5/2015 |
| CN | 105491627 | 4/2016 |

OTHER PUBLICATIONS

EPO, Office Action for EP Application No. 17921386.3, dated May 6, 2020.
3GPP, "Technical Specification Group Services and System Aspects; Network-Based IP Flow Mobility (NBIFOM); Stage 2," Release 14, 3GPP TS 23.161 V14.0.0, Mar. 2017. 67 pages.
3GPP, "Technical Specification Group Radio Access Network; Evolved Universal Terrestrial Radio Access (E-UTRA) and Evolved Universal Terrestrial Radio Access Network (E-UTRAN); Overall Description; Stage 2," Release 13, 3GPP TS 36.300 V13.2.0, Dec. 2015. 290 pages.
EPO, Communication for EP Application No. 17921386.3, dated Jan. 28, 2021.
INAPI, Office Action for CL Application No. 201903488, dated Apr. 19, 2021.
IPI, Office Action for IN Application No. 201917050629, dated Jun. 3, 2021.

* cited by examiner

METHOD AND DEVICE FOR DETERMINING SERVICE PATH

CROSS-REFERENCE TO RELATED APPLICATION

This application is a U.S. national phase application of International Application No. PCT/CN2017/096949, filed Aug. 10, 2017, the entire disclosure of which is incorporated herein by reference.

TECHNICAL FIELD

Embodiments of the present disclosure generally relate to communication technologies, and more particularly, to methods and devices for determining a service path.

BACKGROUND

In a 5G system, a terminal device can access a service through a 3rd Generation Partnership Project (3GPP) network or a non-3GPP network. Specifically, the network side has a service access network node, and the service access network node may be responsible for managing services which the terminal device accesses through the 3GPP network or the non-3GPP network.

Therefore, for a terminal device or a service access network node, how to select a suitable service access path to improve user experiences is an urgent problem to be solved.

SUMMARY

Embodiments of the present disclosure provide methods and devices for determining a service path which are capable of improving user experiences.

According to a first aspect, there is provided a method for determining a service path, comprising:

if a terminal device accesses a network by a first service path, obtaining a network load state of the first service path; and according to the network load state, switching a service path by which the terminal device accesses the network from the first service path to a second service path.

According to exemplary embodiments, the service path is a path by which the terminal device accesses a service access management node.

By monitoring the network load state of the current service path to trigger the switching of the service path by which the terminal device accesses the network, user experiences of the terminal can be improved.

In a possible implementation, the first service path is a non-third generation partnership (non-3GPP) access path, and the second service path is a 3GPP access path; or, the first service path is a 3GPP access path, and the second service path is a non-3GPP access path.

In a possible implementation, switching a service path by which the terminal device accesses the network from the first service path to a second service path according to the network load state, comprises:

if a network on the first service path is not available, switching the service path by which the terminal device accesses the network from the first service path to the second service path.

In a possible implementation, switching a service path by which the terminal device accesses the network from the first service path to a second service path according to the network load state, comprises:

according to a generated random value and a first network access probability, switching the service path by which the terminal device accesses the network from the first service path to the second service path, wherein the first network access probability is used to indicate a probability that the network on the first service path allows the terminal device to access.

In a possible implementation, switching the service path by which the terminal device accesses the network from the first service path to the second service path according to a generated random value and a first network access probability, comprises:

if the random value is greater than the first network access probability, switching the service path by which the terminal device accesses the network from the first service path to the second service path.

In a possible implementation, the method further includes:

obtaining the first network access probability.

In a possible implementation, obtaining the first network access probability comprises:

determining the first network access probability according to an attribute of the terminal device.

In a possible implementation, determining the first network access probability according to an attribute of the terminal device comprises:

determining the first network access probability according to the attribute of the terminal device and a correspondence between attributes of a terminal device and network access probabilities.

In a possible implementation, the attribute of the terminal device comprises at least one of an access class of the terminal device, a type of the terminal device and a priority of the terminal device.

In a possible implementation, obtaining the first network access probability comprises:

determining the first network access probability according to a service attribute of a current service of the terminal device.

In a possible implementation, determining the first network access probability according to a service attribute of a current service of the terminal device comprises:

determining the first network access probability according to the service attribute of the current service of the terminal device and a correspondence between service attributes and network access probabilities.

In a possible implementation, the service attribute comprises at least one of an application type, a QoS level, priority and an access class.

In a possible implementation, the method is performed by the terminal device;

obtaining the first network access probability comprises:

obtaining the first network access probability by using a core network or an access network on the first service path.

In a possible implementation, the method is performed by a service access management node;

obtaining the first network access probability comprises:

obtaining the first network access probability by using a core network, an access network on the first service path, or an operation and maintenance (OM) network.

In a possible implementation, the network access probability comprises an access probability of the access network and/or an access probability of the core network.

According to a second aspect, there is provided a method for determining a service path, comprising:

obtaining a network load state of a first service path in a plurality of service paths;

according to the network load state, determining from the plurality of service paths a target service path of a service to be initiated by a terminal device; and enabling the terminal device to access a network by the target service path.

By determining the service path by which the terminal device accesses the network according to the network load condition on a certain service path, user experiences of the terminal can be improved.

In a possible implementation, the plurality of service paths comprise a non-third generation partnership (non-3GPP) access path and a 3GPP access path.

In a possible implementation, determining from the plurality of service paths a target service path of a service to be initiated by a terminal device according to the network load state, comprises:

if a network on the first service path is not available, determining that the target service path is a second service path among the plurality of service paths.

In a possible implementation, determining from the plurality of service paths a target service path of a service to be initiated by a terminal device according to the network load state, comprises:

determining the target service path according to a generated random value and a first network access probability, wherein the first network access probability is used to indicate a probability that the network on the first service path allows the terminal device to access.

In a possible implementation, determining the target service path according to a generated random value and a first network access probability, comprises:

if the random value is smaller than the first network access probability, determining that the target service path is the first service path; and if the random value is greater than or equal to the first network access probability, determining that the target service path is the second service path among the plurality of service paths.

In a possible implementation, the method further includes:

obtaining the first network access probability.

In a possible implementation, obtaining the first network access probability comprises:

determining the first network access probability according to an attribute of the terminal device.

In a possible implementation, determining the first network access probability according to an attribute of the terminal device comprises:

determining the first network access probability according to an attribute of the terminal device and a correspondence between attributes of a terminal device and network access probabilities.

In a possible implementation, the attribute of the terminal device comprises at least one of an access class of the terminal device, a type of the terminal device and a priority of the terminal device.

In a possible implementation, obtaining the first network access probability comprises:

determining the first network access probability according to a service attribute of a service to be initiated.

In a possible implementation, determining the first network access probability according to a service attribute of a service to be initiated comprises:

determining the first network access probability according to the service attribute of the service to be initiated and a correspondence between service attributes and network access probabilities.

In a possible implementation, the service attribute comprises at least one of an application type, a QoS level, a priority and an access class.

In a possible implementation, the method is performed by a terminal device;

wherein obtaining the first network access probability comprises:

obtaining the first network access probability by using a core network or an access network on the first service path.

In a possible implementation, the method is performed by a service access management node;

wherein obtaining the first network access probability comprises:

obtaining the first network access probability by using a core network, an access network on the first service path, or an operation and maintenance (OM) network.

In a possible implementation, the network access probability comprises an access probability of the access network and/or an access probability of the core network.

According to a third aspect, there is provided a device for determining a service path. The device is configured to performing the methods according to the first aspect or any of the possible implementations in the first aspect. In particular, the device comprises units for performing the methods according to the first aspect or any of the possible implementations in the first aspect.

According to a fourth aspect, there is provided a device for determining a service path. The device is configured to performing the methods according to the second aspect or any of the possible implementations in the second aspect. In particular, the device comprises units for performing the methods according to the second aspect or any of the possible implementations in the second aspect.

According to a fifth aspect, there is provided a device for determining a service path. The includes a memory, a processor, an input interface, and an output interface. The memory, the processor, the input interface, and the output interface are connected by a bus system. The memory is configured to store instructions, and the processor is configured to execute the instructions stored in the memory to perform the methods according to the first aspect or any of the possible implementations in the first aspect.

According to a sixth aspect, there is provided a device for determining a service path. The includes a memory, a processor, an input interface, and an output interface. The memory, the processor, the input interface, and the output interface are connected by a bus system. The memory is configured to store instructions, and the processor is configured to execute the instructions stored in the memory to perform the methods according to the second aspect or any of the possible implementations in the second aspect.

According to a seventh aspect, there is provided a computer storage medium. The computer storage medium is configured to store computer software instructions for performing the methods according to the first aspect or any of the possible implementations in the first aspect, or the methods according to the second aspect or any of the possible implementations in the second aspect. The computer software instructions include programs for performing the above designs.

According to an eighth aspect, there is provided a computer program product comprising instructions. When executed on a computer, the instructions cause a computer to perform the methods according to the first aspect or any of the possible implementations in the first aspect, or the methods according to the second aspect or any of the possible implementations in the second aspect.

These and other aspects of the present disclosure will be more readily apparent from the following description of the embodiments.

DETAILED DESCRIPTION

Figure 1:
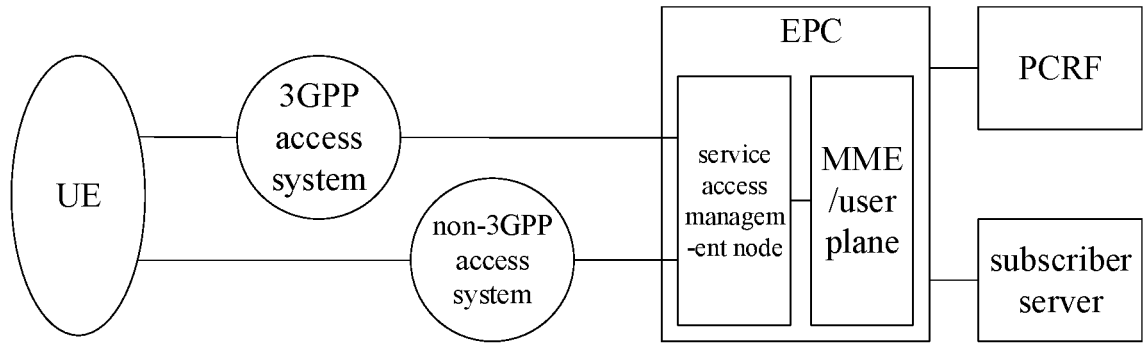
FIG. 1 is a schematic diagram of an application scenario of an embodiment of the present disclosure.

The technical solutions in the embodiments of the present disclosure will be clearly and completely described in the following with reference to the accompanying drawings in the embodiments.

It should be understood that the technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a New Radio (NR) or a future 5G systems, and so on.

In particular, the technical solutions of the embodiments of the present disclosure can be applied to various communication systems based on non-orthogonal multiple access technologies, such as a Sparse Code Multiple Access (SCMA) system, a Low-Density Signature (LDS) system, and so on. Of course, the SCMA system and the LDS system may also be referred to as other names in the communication field. In addition, the technical solutions of the embodiments of the present disclosure can be applied to a multi-carrier transmission system using the non-orthogonal multiple access technology, for example, an Orthogonal Frequency Division Multiplexing (OFDM) system, a Filter Bank Multi-Carrier (FBMC) system, a Generalized Frequency Division Multiplexing (OFDM) system Frequency Division Multiplexing (GFDM), or a Filtered Orthogonal Frequency Division Multiplexing (Filtered-OFDM, F-OFDM) system which uses the non-orthogonal multiple access technology, or the like.

The terminal device in the embodiments of the present disclosure may refer to a user equipment (UE), an access terminal, a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, computing devices or other processing devices connected to wireless modems, in-vehicle devices, wearable devices, terminal devices in future 5G networks, or terminal devices in the future evolutional Public Land Mobile Network (PLMN), and the like. Embodiments of the present disclosure do not impose specification on this.

The network device in the embodiments of the present disclosure may be a device for communicating with a terminal device. The network device may be a Base Transceiver Station (BTS) in GSM or CDMA, or may be a base station (NodeB, NB) in a WCDMA system, or may be an evolutional base station (eNB or eNodeB) in the LTE system, or may be a wireless controller in a cloud radio access network (CRAN) scenario, or the network device may be a relay station, a access point, a in-vehicle device, a wearable device, and a network device in the future 5G network or a network device in the future evolutional Public Land Mobile Network (PLMN), and the like. Embodiments of the present disclosure do not impose specification on this.

FIG. 1 is a schematic block diagram of an application scenario of an embodiment of the present disclosure. As shown in FIG. 1, a UE may access an Evolved Packet Core (EPC) through a 3GPP or non-3GPP access system. The EPC mainly includes a Mobility Management Entity (MME), a User Plane Entity (UPE), and a service access management node. The MME is responsible for mobility management of the control plane, for example, user context and mobility state management, assigning user temporary identity, security functions, and so on. The UPE is responsible for paging for downlink data in an idle state, and managing Internet Protocol (IP) bearer parameters and routing information within the network. The service access management node is mainly responsible for managing access of the 3GPP access system or the non-3GPP access system. The 3GPP access system usually includes various communication systems such as the above LTE or WCDMA system, and the non-3GPP access system includes a Wireless Local Area Network (WLAN), a High Rate Packet Data (HRPD system), or a Worldwide Interoperability for Microwave Access (WiMAX) system, and so on. It should be understood that the 3GPP access system and the non-3GPP access system of the embodiments of the present disclosure include, but are not limited to, the various exemplary communication systems described above. The subscriber server in FIG. 1 is the primary user database for the IP Multimedia Subsystem (IMS) network entity that handles call/session. The subscriber server contains user configuration files, performs user authentication and authorization, and can provide information about the physical location of users. The subscriber server can be, for example, a Home Subscriber Server (HSS) in 3GPP. The Policy and Charging Rules Function (PCRF) is the policy and charging control policy decision point of the service data flow and IP bearer resources. PCRF selects and provides available policy and charging control decisions for the Policy and Charging Enforcement Function (PCEF).

Figure 2:
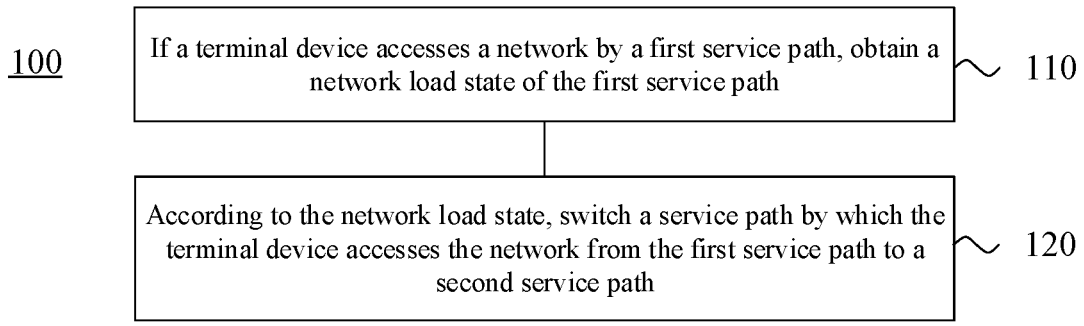
FIG. 2 is a schematic block diagram of a method for determining a service path according to an embodiment of the present disclosure.

FIG. 2 shows a schematic block diagram of a method 100 of determining a service path according to an embodiment of the present disclosure. As shown in FIG. 2, the method 100 includes some or all of the following:

In S110, if a terminal device accesses a network by a first service path, a network load state of the first service path is obtained.

In S120, according to the network load state, a service path by which the terminal device accesses the network is switched from the first service path to a second service path.

Specifically, in the embodiment of the present disclosure, the terminal device or the service access management node may periodically obtain the network load state of the current service path. If the terminal device or the service access management node determines that the current network load state meets the trigger condition, then the terminal device or the service access management node can directly switch the service path. For example, the terminal device currently uses LTE to access the network. Specifically, the terminal device currently accesses the service access management node using the LTE system, and uses LTE to perform service transmission. When the terminal device determines that the network load state of the LTE is not good, for example, the current service is not successfully transmitted for a long time, the terminal device can consider that the currently accessed network has poor performance, and the terminal device can choose to directly switch the terminal device to the WLAN system to transmit the service currently being transmitted.

Therefore, in the method for determining a service path according to the embodiment of the present disclosure, by monitoring the network load state of the current service path to trigger the switching of the service path by which the terminal device accesses the network, user experiences of the terminal can be improved.

The methods in embodiments of the present disclosure may be performed by a terminal device, or may be performed by a service access management node. The service access management node may be a functional entity in a core network device or a device outside the core network device. For the convenience of description, in some embodiments, the terminal device is taken as an example to describe the solutions, but it should be understood that the following various solutions are equally applicable to the service access management node.

In exemplary embodiments of the present disclosure, the first service path is a non-third generation partnership (non-3GPP) access path, and the second service path is a 3GPP access path; or, the first service path is a 3GPP access path, and the second service path is a non-3GPP access path. For example, the first service path may be an LTE network, and the second service path may be a WLAN network. The first service path and the second service path may also be service paths other than the foregoing 3GPP access path and the non-3GPP access path. Embodiments of the present disclosure do not impose specific limitations on this.

According to exemplary embodiments of the present disclosure, switching a service path by which the terminal device accesses the network from the first service path to a second service path according to the network load state, comprises: if a network on the first service path is not available, switching the service path by which the terminal device accesses the network from the first service path to the second service path.

Specifically, the terminal device can periodically obtain the current network load state. For example, the terminal device can start a timer immediately after sending the service to the network. If the timer expires and the terminal device does not receive the response from the network side, the network of the current service path can be considered as unavailable, and the terminal device can switch the current service path to another service path. Embodiments of the present disclosure do not impose any limitation on how the terminal device learns that the network on the current service path is unavailable.

According to exemplary embodiments of the present disclosure, switching a service path by which the terminal device accesses the network from the first service path to a second service path according to the network load state, comprises:

according to a generated random value and a first network access probability, switching the service path by which the terminal device accesses the network from the first service path to the second service path, wherein the first network access probability is used to indicate a probability that the network on the first service path allows the terminal device to access.

Specifically, the network device may broadcast a series of access probabilities and access delays for different access classes to the terminal device by using a system message. After obtaining the access probabilities, the terminal device generates a random value between 0 and 1. The random value is compared with the obtained access probability. If the random value is within the access probability range, the terminal device can access the network by using the current service path without performing switching of the service path. If the generated random value is greater than the obtained access probability, the terminal device may switch the current service path to another service path.

As mentioned above, the terminal device may obtain a series of access probabilities from a system message or a broadcast message. The access probabilities may be sent for different terminal devices, and the terminal device may first determine which access probability is for the terminal device itself. For example, the message carrying the access probabilities may carry the identifier of the terminal device, and after the terminal device receives the message, the terminal device can know whether the access probabilities in the message is for terminal device itself according to the terminal identifier.

According to exemplary embodiments, the terminal device can determine the first network access probability according to an attribute of the terminal device.

Specifically, the attribute of the terminal device may be an access class, a type of the terminal device, or a priority of the terminal device. For example, the network may configure different access classes in advance to correspond to different network access probabilities. Each terminal device has its own access class. After obtaining its own access class, the terminal device can find the access probability corresponding to the terminal device according to the correspondence configured by the network. For another example, the network may configure in advance that different types of terminals correspond to different network access probabilities. Each terminal device can find the network access probability corresponding to itself according to its own type and the correspondence configured by the network. For another example, the network may configure in advance that priorities of different terminal devices correspond to different network access probabilities. The terminal device can find the network access probability corresponding to itself according to its own priority in the correspondence configured by the network.

It should be understood that, in the above examples, the attribute of the terminal device is described as the access class, the type of the terminal device, or the priority of the terminal device, and however, embodiments of the present disclosure are not limited to these examples.

According to exemplary embodiments, the terminal device may determine the first network access probability according to a service attribute of the current service of the terminal device.

Specifically, the service attribute of the current service of the terminal device may be an application type of the service, a quality of service (QoS) level of the service, a priority of the service, or an access class of the service. For example, the network may configure in advance that different application types correspond to different network access probabilities. Each service has its own application type. After obtaining the application type of the current service, the terminal device can find the access probability corresponding to the current service according to the correspondence configured by the network. For another example, the network may configure in advance that different QoS levels of services correspond to different network access probabilities. The terminal device can find the network access probability corresponding to the QoS level of the current service according to the QoS level of the current service and the correspondence configured by the network. For another example, the network may configure in advance that different service priorities correspond to different network access probabilities. The terminal device can find the network access probability corresponding to the current service from the correspondence configured by the network according to the priority of the current service. For another example, the network may configure in advance that access classes of different services correspond to different network access probabilities. The terminal device may find the network access probability corresponding to the current service according to the access class of the current service and the correspondence configured by the network.

It should be understood that, in the above examples, the service attribute is described as the application type, the QoS level of the service, the priority of the service, or the access class of the service, and however, embodiments of the present disclosure are not limited to these examples.

It should also be understood that the foregoing various correspondences may be configured by the network, or may be preset in the terminal device according to a protocol, or may be agreed by the terminal device and an operator.

According to exemplary embodiments of the present disclosure, the method is performed by the terminal device; and obtaining the first network access probability comprises: obtaining the first network access probability by using a core network or an access network on the first service path.

According to exemplary embodiments of the present disclosure, the method is performed by a service access management node; obtaining the first network access probability comprises: obtaining the first network access probability by using a core network, an access network on the first service path, or an operation and maintenance (OM) network.

It should be understood that the network access probability may be an access probability of the access network, or may be an access probability of the core network, and embodiments of the present disclosure do not impose specific limitations on this.

Figure 3:
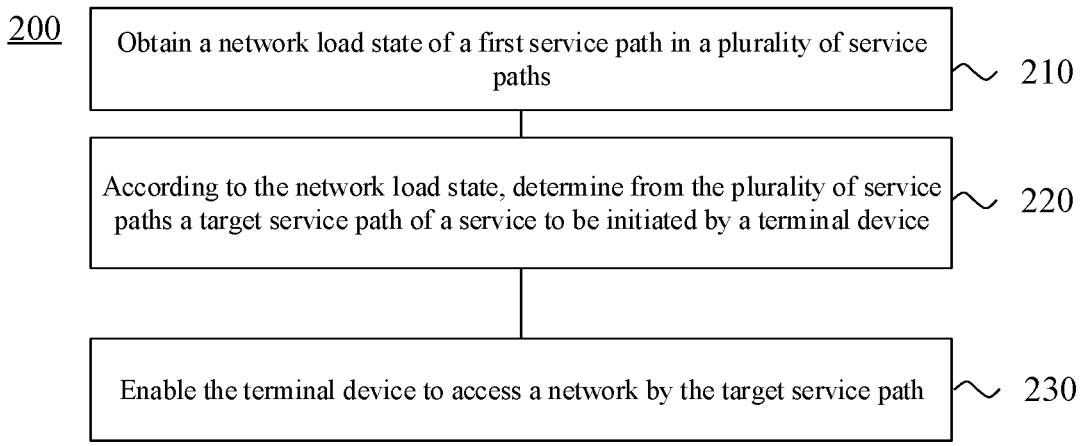
FIG. 3 is another schematic block diagram of a method for determining a service path according to an embodiment of the present disclosure.

FIG. 3 shows a schematic block diagram of a method 200 for determining a service path according to an embodiment of the present disclosure. As shown in FIG. 3, the method 200 can be performed by a terminal device or a service access management node, and the method 200 includes some or all of the following contents:

In S210, a network load state of a first service path in a plurality of service paths is obtained.

In S220, according to the network load state, a target service path of a service to be initiated by a terminal device is determined from the plurality of service paths.

In S230, the terminal device is enabled to access the network by using the target service path.

Specifically, in the embodiments of the present disclosure, before starting the service, the terminal device may first determine whether a service path meets requirements according to the network load state on the service path. If the service path meets the requirements, it is considered that the service path can be used to transmit services. If the service path does not meet the requirements, the service path can be considered as being incapable of transmitting services, and the terminal device can use other service paths to transmit services. For example, the terminal device may first determine the network load state on the LTE before initiating the service. If the network load state on the LTE is not good, the terminal device may directly select the WLAN to transmit the service.

In the method for determining a service path according to embodiments of the present disclosure, by determining the service path by which the terminal device accesses the network according to the network load condition on a certain service path, user experiences of the terminal can be improved.

The methods in embodiments of the present disclosure may be performed by a terminal device, or may be performed by a service access management node. The service access management node may be a functional entity in a core network device or a device outside the core network device. For the convenience of description, in some embodiments, the terminal device is taken as an example to describe the solutions, but it should be understood that the following various solutions are equally applicable to the service access management node.

In exemplary embodiments of the present disclosure, the target service path includes a non-third generation partnership (non-3GPP) access path, or a 3GPP access path. For example, the target service path may be a WLAN network. The target service path may also be service paths other than the foregoing 3GPP access path and the non-3GPP access path. Embodiments of the present disclosure do not impose specific limitations on this.

For example, the terminal device may obtain the network load state of a certain service path from another terminal device before initiating the service. The another terminal device may be provided with the network service by the access network device in the cell where the terminal device is located. Embodiments of the present disclosure do not impose limitations on how the terminal device obtains the network load state of the certain service path.

According to exemplary embodiments of the present disclosure, determining from the plurality of service paths a target service path of a service to be initiated by a terminal device according to the network load state, comprises: if a network on the first service path is not available, determining that the target service path is a second service path among the plurality of service paths; and if the network on the first service path is available, determining that the target service path is the first service path.

Specifically, the terminal device obtains the network load state of the first service path before initiating the service. For example, before the terminal device initiates the service, the terminal device initiates a request to other terminal devices that are in the same cell as the terminal device, and requests the other terminal devices to notify the terminal device of whether the 3GPP access network of the cell is available.

After receiving the request from the terminal device, the other terminal devices can notify the terminal device whether the 3GPP access network is available. The terminal device can determine whether to access the network by the 3GPP access network or by the non-3GPP access network, depending on whether the 3GPP access network is available.

According to exemplary embodiments of the present disclosure, determining from the plurality of service paths a target service path of a service to be initiated by a terminal device according to the network load state, comprises: determining the target service path according to a generated random value and a first network access probability, wherein the first network access probability is used to indicate a probability that the network on the first service path allows the terminal device to access.

Specifically, the network device may broadcast a series of access probabilities and access delays for different access classes to the terminal device by using a system message. After obtaining the access probabilities, the terminal device generates a random value between 0 and 1. The random value is compared with the obtained access probability. If the random value is within the access probability range, the terminal device can access the network by directly using the current service path on which the decision is made. If the generated random value is greater than the obtained access probability, the terminal device may use other service path to access the network.

As mentioned above, the terminal device may obtain a series of access probabilities from a system message or a broadcast message. The access probabilities may be sent for different terminal devices, and the terminal device may first determine which access probability is for the terminal device itself. For example, the message carrying the access probabilities may carry the identifier of the terminal device, and after the terminal device receives the message, the terminal device can know whether the access probability (or probabilities) in the message is for terminal device itself according to the terminal identifier.

According to exemplary embodiments of the present disclosure, the terminal device can determine the first network access probability according to an attribute of the terminal device.

Specifically, the attribute of the terminal device may be an access class, a type of the terminal device, or a priority of the terminal device. For example, the network may configure different access classes in advance to correspond to different network access probabilities. Each terminal device has its own access class. After obtaining its own access class, the terminal device can find the access probability corresponding to the terminal device according to the correspondence configured by the network. For another example, the network may configure in advance that different types of terminals correspond to different network access probabilities. Each terminal device can find the network access probability corresponding to itself according to its own type and the correspondence configured by the network. For another example, the network may configure in advance that priorities of different terminal devices correspond to different network access probabilities. The terminal device can find the network access probability corresponding to itself according to its own priority in the correspondence configured by the network.

It should be understood that, in the above examples, the attribute of the terminal device is described as the access class, the type of the terminal device, or the priority of the terminal device, and however, embodiments of the present disclosure are not limited to these examples.

According to exemplary embodiments, the terminal device may determine the first network access probability according to a service attribute of the current service of the terminal device.

Specifically, the service attribute of the current service of the terminal device may be an application type of the service, a quality of service (QoS) level of the service, a priority of the service, or an access class of the service. For example, the network may configure in advance that different application types correspond to different network access probabilities. Each service has its own application type. After obtaining the application type of the current service, the terminal device can find the access probability corresponding to the current service according to the correspondence configured by the network. For another example, the network may configure in advance that different QoS levels of services correspond to different network access probabilities. The terminal device can find the network access probability corresponding to the QoS level of the current service according to the QoS level of the current service and the correspondence configured by the network. For another example, the network may configure in advance that different service priorities correspond to different network access probabilities. The terminal device can find the network access probability corresponding to the current service from the correspondence configured by the network according to the priority of the current service. For another example, the network may configure in advance that access classes of different services correspond to different network access probabilities. The terminal device may find the network access probability corresponding to the current service according to the access class of the current service and the correspondence configured by the network.

According to exemplary embodiments of the present disclosure, the method is performed by the terminal device; and obtaining the first network access probability comprises: obtaining the first network access probability by using a core network or an access network on the first service path.

According to exemplary embodiments of the present disclosure, the method is performed by a service access management node; obtaining the first network access probability comprises: obtaining the first network access probability by using a core network, an access network on the first service path, or an operation and maintenance (OM) network.

It should be understood that the network access probability may be an access probability of the access network, or may be an access probability of the core network, and embodiments of the present disclosure do not impose specific limitations on this.

According to exemplary embodiments of the present disclosure, the terminal device may access the service access management node by the target service path.

It should be understood that, in various embodiments of the present disclosure, the sequence numbers of the above-mentioned processes do not mean the order of execution, and the execution order of the processes should be determined by their functions and internal logics, and should not constitute any limitation on the implementation processes of the embodiments of the present disclosure.

The methods for determining a service path according to embodiments of the present disclosure are described in detail above. Hereinafter, devices for determining a service path according to embodiments of the present disclosure will be described with reference to FIG. 4 to FIG. 7. The technical features described in the method embodiments are applicable to the following device embodiments.

Figure 4:
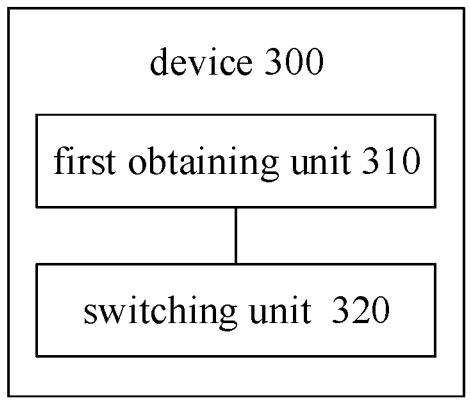
FIG. 4 is a schematic block diagram of a device for determining a service path according to an embodiment of the present disclosure.

FIG. 4 shows a schematic block diagram of a device 300 for determining a service path according to an embodiment of the present application. As shown in FIG. 4, the device 300 includes a first obtaining unit 310 and a switching unit 320.

The first obtaining unit 310 is configured to, if a terminal device accesses a network by a first service path, obtain a network load state of the first service path.

The switching unit 320 is configured to, according to the network load state, switch a service path by which the terminal device accesses the network from the first service path to a second service path.

In the device for determining a service according to embodiments of the present disclosure, by monitoring the network load state of the current service path to trigger the switching of the service path by which the terminal device accesses the network, user experiences of the terminal can be improved.

According to exemplary embodiments of the present disclosure, the first service path is a non-third generation partnership (non-3GPP) access path, and the second service path is a 3GPP access path; or, the first service path is a 3GPP access path, and the second service path is a non-3GPP access path.

According to exemplary embodiments of the present disclosure, the switching unit is configured to: if a network on the first service path is not available, switch the service path by which the terminal device accesses the network from the first service path to the second service path.

According to exemplary embodiments of the present disclosure, the switching unit is configured to: according to a generated random value and a first network access probability, switch the service path by which the terminal device accesses the network from the first service path to the second service path, wherein the first network access probability is used to indicate a probability that the network on the first service path allows the terminal device to access.

According to exemplary embodiments of the present disclosure, the switching unit is configured to: if the random value is greater than the first network access probability, switch the service path by which the terminal device accesses the network from the first service path to the second service path.

According to exemplary embodiments of the present disclosure, the device further includes: a second obtaining unit configured to obtain the first network access probability.

According to exemplary embodiments of the present disclosure, the second obtaining unit is configured to: determine the first network access probability according to an attribute of the terminal device.

According to exemplary embodiments of the present disclosure, the second obtaining unit is configured to: determine the first network access probability according to the attribute of the terminal device and a correspondence between attributes of a terminal device and network access probabilities.

According to exemplary embodiments of the present disclosure, the attribute of the terminal device comprises at least one of an access class of the terminal device, a type of the terminal device and a priority of the terminal device.

According to exemplary embodiments of the present disclosure, the second obtaining unit is configured to: determine the first network access probability according to a service attribute of a current service of the terminal device.

According to exemplary embodiments of the present disclosure, the second obtaining unit is configured to: determine the first network access probability according to the service attribute of the current service of the terminal device and a correspondence between service attributes and network access probabilities.

According to exemplary embodiments of the present disclosure, the service attribute comprises at least one of an application type, a QoS level, priority and an access class.

According to exemplary embodiments of the present disclosure, the device is a terminal device; the second obtaining unit is configured to: obtain the first network access probability by using a core network or an access network on the first service path.

According to exemplary embodiments of the present disclosure, the device is a service access management node; the second obtaining unit is configured to: obtain the first network access probability by using a core network, an access network on the first service path, or an operation and maintenance (OM) network.

According to exemplary embodiments of the present disclosure, the network access probability comprises an access probability of the access network and/or an access probability of the core network.

It should be understood that the terminal device 300 according to the embodiments of the present disclosure may be configured to perform the method 100 according to embodiments of the present disclosure, and the above-mentioned and other operations and/or functions of each unit in the terminal device 300 are respectively for implementing the corresponding processes of the terminal device in the methods described with reference to FIG. 2, and for brevity, repeated descriptions are omitted here.

Figure 5:
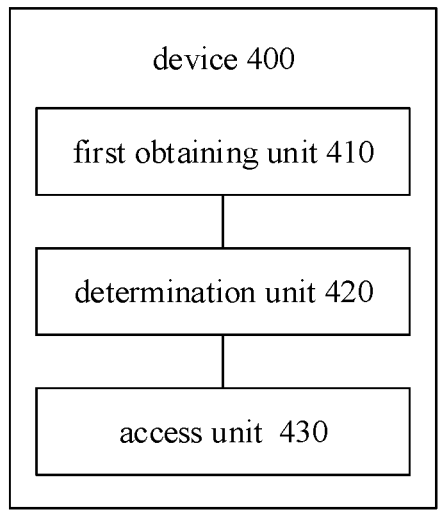
FIG. 5 is another schematic block diagram of a device for determining a service path according to an embodiment of the present disclosure.

FIG. 5 shows a schematic block diagram of a device 400 for determining a service path according to an embodiment of the present disclosure. As shown in FIG. 5, the device 400 includes a first obtaining unit 410, a determination unit 420 and an access unit 430.

The first obtaining unit 410 is configured to obtain a network load state of a first service path in a plurality of service paths.

The determination unit 420 is configured to, according to the network load state, determine from the plurality of service paths a target service path of a service to be initiated by a terminal device.

The access unit 430 is configured to enable the terminal device to access a network by the target service path.

In the device for determining a service path according to embodiments of the present disclosure, by determining the service path by which the terminal device accesses the network according to the network load condition on a certain service path, user experiences of the terminal can be improved.

According to exemplary embodiments of the present disclosure, the plurality of service paths comprise a non-third generation partnership (non-3GPP) access path and a 3GPP access path.

According to exemplary embodiments of the present disclosure, the determination unit is configured to: if a network on the first service path is not available, determine that the target service path is a second service path among the plurality of service paths; if the network on the first service path is available, determine that the target service path is the first service path.

According to exemplary embodiments of the present disclosure, the determination unit is configured to: determine the target service path according to a generated random value and a first network access probability, wherein the first network access probability is used to indicate a probability that the network on the first service path allows the terminal device to access.

According to exemplary embodiments of the present disclosure, the determination unit is configured to: if the random value is smaller than the first network access probability, determine that the target service path is the first service path; and if the random value is greater than or equal to the first network access probability, determine that the target service path is the second service path among the plurality of service paths.

According to exemplary embodiments of the present disclosure, the device further includes: a second obtaining unit configured to obtain the first network access probability.

According to exemplary embodiments of the present disclosure, the second obtaining unit is configured to: determine the first network access probability according to an attribute of the terminal device.

According to exemplary embodiments of the present disclosure, the second obtaining unit is configured to: determine the first network access probability according to an attribute of the terminal device and a correspondence between attributes of a terminal device and network access probabilities.

According to exemplary embodiments of the present disclosure, the attribute of the terminal device comprises at least one of an access class of the terminal device, a type of the terminal device and a priority of the terminal device.

According to exemplary embodiments of the present disclosure, the second obtaining unit is configured to: determine the first network access probability according to a service attribute of a service to be initiated.

According to exemplary embodiments of the present disclosure, the second obtaining unit is configured to: determine the first network access probability according to the service attribute of the service to be initiated and a correspondence between service attributes and network access probabilities.

According to exemplary embodiments of the present disclosure, the service attribute comprises at least one of an application type, a QoS level, a priority and an access class.

According to exemplary embodiments of the present disclosure, the device is a terminal device; the second obtaining unit is configured to: obtain the first network access probability by using a core network or an access network on the first service path.

According to exemplary embodiments of the present disclosure, the device is a service access management node; the second obtaining unit is configured to: obtain the first network access probability by using a core network, an access network on the first service path, or an operation and maintenance (OM) network.

According to exemplary embodiments of the present disclosure, the network access probability comprises an access probability of the access network and/or an access probability of the core network.

It should be understood that the terminal device 400 according to the embodiments of the present disclosure may be configured to perform the method 200 according to embodiments of the present disclosure, and the above-mentioned and other operations and/or functions of each unit in the terminal device 400 are respectively for implementing the corresponding processes of the terminal device in the methods described with reference to FIG. 3, and for brevity, repeated descriptions are omitted here.

Figure 6:
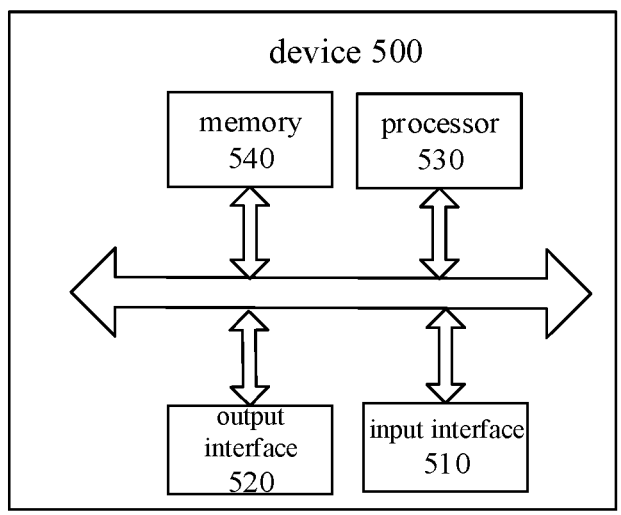
FIG. 6 is still another schematic block diagram of a device for determining a service path according to an embodiment of the present disclosure.

FIG. 6 shows a schematic block diagram of a device 500 for determining a service path according to an embodiment of the present disclosure. The device 500 may be the device 300 in FIG. 4, and can be configured to perform the methods 100 described with reference to FIG. 2. The device 500 includes an input interface 510, an output interface 520, a processor 530 and a memory 540. The input interface 510, the output interface 520, the processor 530 and the memory 540 a connected by a bus system. The memory 540 is configured to store programs, instructions or codes. The processor 530 is configured to execute the programs, instructions or codes stored in the memory 540 to control the input interface 510 to receive signals, and control the output interface 520 to send signals and complete the operations in the previously described method embodiments.

In the device for determining a service according to embodiments of the present disclosure, by monitoring the network load state of the current service path to trigger the switching of the service path by which the terminal device accesses the network, user experiences of the terminal can be improved.

It should be understood that, in the embodiment of the present disclosure, the processor 530 may be a central processing unit (CPU), and the processor 530 may also be another general-purpose processor, a digital signal processor (DSP), Application Specific Integrated Circuit (ASIC), Field Programmable Gate Array (FPGA) or other programmable logic device, discrete gate or transistor logic device, discrete hardware component, etc. The general purpose processor may be a microprocessor or the processor or any conventional processor or the like.

The memory 540 can include read only memory and random access memory and provides instructions and data to the processor 530. A portion of the memory 540 may also include a non-volatile random access memory. For example, the memory 540 can also store information of the device type.

In the implementations, the processes in the foregoing methods may be completed by an integrated logic circuit of hardware in the processor 530 or an instruction in a form of software. The contents of the methods disclosed in the embodiments of the present disclosure may be directly implemented by a hardware processor, or may be performed by a combination of hardware and software modules in the processor. The software modules can be located in a conventional storage medium such as random access memory, flash memory, read only memory, programmable read only memory or electrically erasable programmable memory, registers, or other well-known storage mediums in this art. The storage medium is located in the memory 540, and the processor 530 reads the information in the memory 540 and completes the contents of the above methods in corporation with the hardware. Repeated descriptions are not provided here for brevity.

In a specific implementation, the first obtaining unit, the switching unit and the second obtaining unit in the device 300 may be implemented by the processor 530 as shown in FIG. 6.

Figure 7:
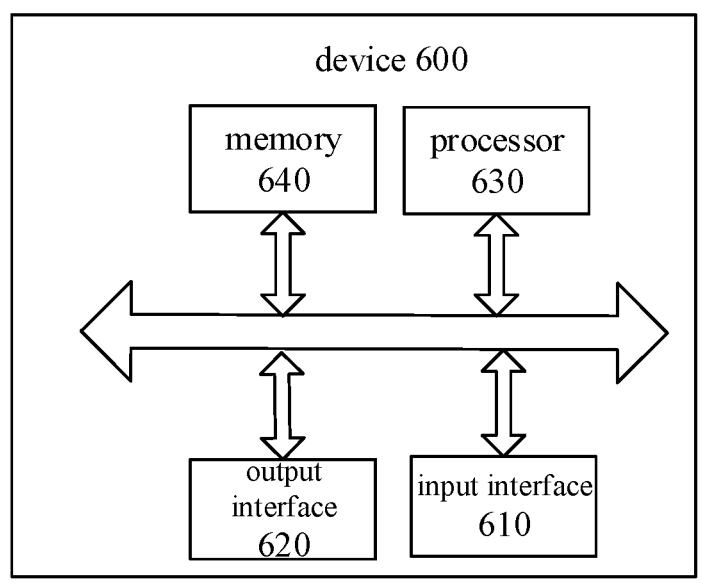
FIG. 7 is still another schematic block diagram of a device for determining a service path according to an embodiment of the present disclosure.

FIG. 7 shows a schematic block diagram of a device 600 according to an embodiment of the present disclosure. The device 600 may be the device 400 in FIG. 5, and can be configured to perform the methods 200 described with reference to FIG. 3. The device 600 includes an input interface 610, an output interface 620, a processor 630 and a memory 640. The input interface 610, the output interface 620, the processor 630 and the memory 640 a connected by a bus system. The memory 640 is configured to store programs, instructions or codes. The processor 630 is configured to execute the programs, instructions or codes stored in the memory 640 to control the input interface 610 to receive signals, and control the output interface 620 to send signals and complete the operations in the previously described method embodiments.

In the terminal device according to embodiments of the present disclosure, by determining the service path by which the terminal device accesses the network according to the network load condition on a certain service path, user experiences of the terminal can be improved.

It should be understood that in the embodiments of the present disclosure, the processor 630 may be a central processing unit (CPU), and the processor 630 can also be general purpose processors, digital signal processors (DSPs), application specific integrated circuits (ASICs), field programmable gate arrays (FPGAs) or other programmable logic devices, discrete gates or transistor logic devices, discrete hardware components, and so on. The general purpose processor may be a microprocessor can also be any conventional processor, and so on.

The memory 640 may include a read only memory and a random access memory and provides instructions and data to the processor 630. A portion of the memory 640 may also include a non-volatile random access memory. For example, the memory 640 can also store information of the device type.

In the implementation, the operations of the foregoing methods may be completed by an integrated logic circuit of hardware in the processor 630 or an instruction in a form of software. The steps of the methods disclosed in the embodiments of the present disclosure may be directly implemented by the hardware processor, or may be performed by a combination of hardware and software modules in the processor. The software modules can be located in a conventional storage medium such as a random access memory, a flash memory, a read only memory, a programmable read only memory or an electrically erasable programmable memory, a register, or other well-known storage mediums in this art. The storage medium is located in the memory 640, and the processor 630 reads the information in the memory 640 and completes the steps of the above methods in corporation with hardware. Repeated descriptions are omitted for brevity.

In a specific implementation, the determination unit, the access unit, the first obtaining unit and the second obtaining unit in the device 400 may be implemented by the processor 630 in FIG. 7.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that for the convenience and brevity of the description, details of specific operation procedures of the systems, devices and units can be found in the previous descriptions regarding the method embodiments, and details are not described herein again.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the methods described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for determining a service path, comprising:
   if a terminal device accesses a network by a first service path, obtaining a network load state of the first service path; and
   according to the network load state, switching a service path by which the terminal device accesses the network from the first service path to a second service path;
   wherein switching a service path by which the terminal device accesses the network from the first service path to a second service path according to the network load state, comprises:
   according to a generated random value and a first network access probability, switching the service path by which the terminal device accesses the network from the first service path to the second service path, wherein the first network access probability is used to indicate a probability that the network on the first service path allows the terminal device to access;

wherein the method further comprises:
determining the first network access probability that matches a quality of service (QoS) level of a current service of the terminal device according to a correspondence between QoS levels and network access probabilities, wherein the correspondence between QoS levels and network access probabilities is preset in the terminal device; and
if the random value is greater than the first network access probability, switching the service path by which the terminal device accesses the network from the first service path to the second service path.

2. The method according to claim 1, wherein the first service path is a non-third generation partnership (non-3GPP) access path, and the second service path is a 3GPP access path; or, the first service path is a 3GPP access path, and the second service path is a non-3GPP access path.

3. The method according to claim 1, wherein switching a service path by which the terminal device accesses the network from the first service path to a second service path according to the network load state, comprises:
if a network on the first service path is not available, switching the service path by which the terminal device accesses the network from the first service path to the second service path.

4. The method according to claim 1, wherein the method is performed by the terminal device;
wherein obtaining the first network access probability comprises:
obtaining the first network access probability by using a core network or an access network on the first service path.

5. The method according to claim 1, wherein the method is performed by a service access management node;
wherein obtaining the first network access probability comprises:
obtaining the first network access probability by using a core network, an access network on the first service path, or an operation and maintenance (OM) network.

6. The method according to claim 1, wherein the network access probability comprises an access probability of the access network and/or an access probability of a core network.

7. The method according to claim 1, wherein the service path is a path by which the terminal device accesses a service access management node.

8. A device for determining a service path, comprising:
a processor; and
a memory storing instructions executable by the processor;
wherein the processor is configured to:
if a terminal device accesses a network by a first service path, obtain a network load state of the first service path; and
according to the network load state, switch a service path by which the terminal device accesses the network from the first service path to a second service path;
wherein the processor is configured to:
according to a generated random value and a first network access probability, switch the service path by which the terminal device accesses the network from the first service path to the second service path, wherein the first network access probability is used to indicate a probability that the network on the first service path allows the terminal device to access;
wherein the processor is further configured to:
determine the first network access probability that matches a quality of service (QoS) level of a current service of the terminal device according to a correspondence between service attributes and network access probabilities, wherein the correspondence between QoS levels and network access probabilities is preset in the terminal device; and
if the random value is greater than the first network access probability, switch the service path by which the terminal device accesses the network from the first service path to the second service path.

9. The device according to claim 8, wherein the first service path is a non-third generation partnership (non-3GPP) access path, and the second service path is a 3GPP access path; or, the first service path is a 3GPP access path, and the second service path is a non-3GPP access path.

10. The device according to claim 8, wherein the processor is configured to:
if a network on the first service path is not available, switch the service path by which the terminal device accesses the network from the first service path to the second service path.

* * * * *